US008659810B2

(12) United States Patent
Joo

(10) Patent No.: US 8,659,810 B2
(45) Date of Patent: Feb. 25, 2014

(54) APPARATUS FOR THE EXACT RECONSTRUCTION OF THE OBJECT WAVE IN OFF-AXIS DIGITAL HOLOGRAPHY

(75) Inventor: Ki-Nam Joo, Gwangju (KR)

(73) Assignee: Mitutoyo Corporation, Kanagawa (JP)

( * ) Notice: Subject to any disclaimer, the term of this patent is extended or adjusted under 35 U.S.C. 154(b) by 83 days.

(21) Appl. No.: 13/341,178

(22) Filed: Dec. 30, 2011

(65) Prior Publication Data

US 2013/0057935 A1    Mar. 7, 2013

(30) Foreign Application Priority Data

Sep. 2, 2011   (EP) ..................................... 11179946

(51) Int. Cl.
| | |
|---|---|
| *G03H 1/16* | (2006.01) |
| *G03H 1/10* | (2006.01) |
| *G06K 9/36* | (2006.01) |
| *G06E 3/00* | (2006.01) |

(52) U.S. Cl.
CPC .. *G03H 1/16* (2013.01); *G03H 1/10* (2013.01); *G06E 3/003* (2013.01)
USPC ................................ 359/29; 359/10; 382/280

(58) Field of Classification Search
USPC ............... 359/10, 29; 382/154, 280, 282, 284
See application file for complete search history.

(56) References Cited

U.S. PATENT DOCUMENTS

| 6,262,818 | B1 | 7/2001 | Cuche et al. |
| 6,809,845 | B1 | 10/2004 | Kim et al. |

FOREIGN PATENT DOCUMENTS

WO    2004/094942    11/2004

OTHER PUBLICATIONS

European Search Report, dated Jan. 12, 2012, from European Patent Office (EPO) for counterpart European patent application.
Tristan Colomb et al., "Polarization digital holographic microscope: a single acquisition for a complete determination of polarization state", Proceedings of SPIE, vol. 6252, pp. 625227-1 to 625227-5, XP-007903284, May 21, 2005.
Pascal Picart et al., "Twin-sensitivity measurement by spatial multiplexing of digitally recorded holograms", Applied Optics, Optical Society of America, vol. 42, No. 11, pp. 1947-1957, XP009155323, Apr. 10, 2003.
G. Pedrini et al., "Quantitative evaluation of two-dimensional dynamic deformations using digital holography", Optics & Laser Technology, vol. 29, No. 5, pp. 249-256, XP004090206, Jul. 1, 1997.
Kreis et al., "Suppression of the dc term in digital holography", Optical Engineering, vol. 36, No. 8, Aug. 1997, pp. 2357-2360.
Cuche et al., "Spatial filtering for zero-order and twin-image elimination in digital off-axis holography", Applied Optics, vol. 39, No. 23, Aug. 2000, pp. 4070-4075.
Pavillon et al., "Suppression of the zero-order term in off-axis digital holography through nonlinear filtering", Applied Optics, vol. 48, No. 34, Dec. 2009, pp. H186-H195.
Pavillon et al., "Iterative method of zero-order suppression in off-axis digital holography", Optics Express, vol. 18, No. 15, Jul. 2010, pp. 15318-15331.

*Primary Examiner* — Thomas K Pham
*Assistant Examiner* — Cara Rakowski
(74) *Attorney, Agent, or Firm* — Greenblum & Bernstein, P.L.C.

(57) ABSTRACT

A method and apparatus for preparing a digital hologram representing an image of an object includes generating a measurement beam and a first reference beam, irradiating the object by the measurement beam, and guiding the measurement beam reflected to an optical sensor. The method also includes guiding the first reference beam to a first mirror, and guiding the reflected beam to the optical sensor so that both beams generate an interference pattern on the sensor. The method includes providing a digital signal representing the interference pattern on the optical sensor, to obtain a digital hologram, and subjecting the digital hologram to a Fourier transform in the spatial frequency domain to obtain a spectrum. The method further includes replacing a section of a first image term overlapped by a DC-term by a corresponding section of a second image term.

13 Claims, 13 Drawing Sheets

PRIOR ART

PRIOR ART

PRIOR ART

APPARATUS FOR THE EXACT RECONSTRUCTION OF THE OBJECT WAVE IN OFF-AXIS DIGITAL HOLOGRAPHY

INCORPORATION BY REFERENCE

This application is based upon and claims the benefit of priority from European patent application No. 11179946.6, filed on Sep. 2, 2011, the disclosure of which is incorporated herein in its entirety by reference.

BACKGROUND OF THE INVENTION

1. Field of the Invention

This invention is related to the amplitude and quantitative phase imaging using digital holography of digital holographic microscopy for real time 3D measurements.

2. Description of Related Art

Digital holography is an effective tool to record not only the amplitude image but also the phase image contrary to the normal imaging techniques. The main advantage of digital holography is obviously originated from the real time 3D measurements of the target with only a single image. In addition, digital holography allows reconstruction of the amplitude and phase of the object wave even though the specimen is not in the best focus or the optical system includes aberrations.

Based on these advantages, recently, digital holography has been widely used in industrial and science fields, especially in biomedical fields where the amplitude and phase images of live cells should be monitored in real time. In manufacturing industrial products, digital holography can raise the throughput significantly with the real time inspection of the products topographically as well as tomographically.

The principle of digital holography starts from the traditional holography, based on two-step process, recording and reconstruction. In the recording process, the scattered wave from the object interferes with the reference wave and the interference pattern is recorded in a photosensitive media, i.e. it generates 'hologram'. After the recording process, reconstruction of the object image is carried out by illuminating the same reference wave to the hologram without the object.

Similar to this, digital holography also has the same procedures as traditional holography, but it uses a video camera or optical sensor as a recording media. Moreover, the digital hologram allows a numerical image reconstruction wherein the physical reconstruction wave is simulated virtually and the object wave can be recovered by numerical wave propagations.

Digital holography (DH) can be typically categorized in off-axis DH and in-line DH, according to the optical configuration, i.e. the alignment between reference and measurement waves. In order to avoid a DC term (zero-order diffraction) and twin image term (conjugate of the object wave) overlapping the object wave term, off-axis DH uses a spatial modulation and spatial filtering technique with a tilt angle between reference and measurement waves. Without the effort that in-line DH takes to eliminate these noise effects, off-axis DH allows reconstruction of the amplitude and phase image of the specimen from the hologram.

On the other hand, in-line DH typically adopts other techniques such as phase shifting to extract only the object wave from the hologram. Inherently, in-line DH loses the main strength such as real time measurement ability in the applications, although in-line DH allows clear reconstructing of the image. Recently, in order to overcome this limitation, parallel optical-path-length-shifting DH based on the spatial phase shifting device has been proposed for real time measurements. However, this method is limited by the available number of pixels in the CCD camera or optical sensor.

In the off-axis DH, most widely used in the industrial and science fields, the spatial modulation of the image caused by the tilt of the reference mirror is introduced in the digital hologram as shown in FIG. 1 and it is used for the filtering process to extract the object wave in the spatial frequency domain. The configuration depicted in FIG. 1 comprises a light source 1, like a laser light source, a beam splitter 3, a condensing lens 2 located between the light source 1 and the beam splitter 3, a reference mirror 5, a first objective lens 4 located an imaging lens 6, an optical sensor 7, a second objective lens 8 and holder for a sample 9.

The light source 1 emits a first reference beam 10 passing the condensing lens 2, the beam splitter 3, the first objective lens 4, the reference mirror 5, where it is reflected, again the first objective lens 4, the beam splitter 3 where the reference beam is deflected to the imaging lens 6 and it hits the optical sensor 7.

Further the light source 1 emits a measurement light beam 11 which passes the condensing lens 2, is deflected by the beam splitter 3, passes the second objective lens 8, hits the sample 9, is reflected by sample 9, passes again the second objective lens 8, the beam splitter 3, the imaging lens 6 and finally hits the sensor 7 to form an interference pattern together with the first reference beam 10.

The main advantage of the off-axis configuration is the ability to obtain the objective wave with a single hologram contrary to the other configurations such as inline digital holography and phase shifting digital holography. After obtaining a digital hologram which contains interference fringes by the off-axis geometry, the two-dimensional spectrum of the hologram can be obtained by the Fourier transform in the spatial frequency domain, where the different terms of the interference produce well-separated contributions. The spectrum of a DC term, which is a depicted as the spectrum in the centre of FIG. 5A, represents the spectrum of the intensities for reference and object waves (no interference terms).

The spatial frequencies of the interference terms are located symmetrically with respect to the centre of the image. Their distances to the centre depend on the incidence tilt angle, which must be large enough to ensure a complete separation of the DC term from those of the interference terms. Then the unwanted terms can be filtered out in the spatial frequency domain and only the object wave can be extracted and obtained although the spatial frequency is limited in spite of using a high resolution camera. After filtering, the amplitude and phase image of the object are obtained by numerical reconstruction of the hologram with a plane wave as a reference wave.

More in particular the prior art discloses a method for preparing a digital hologram representing an image of an object, the method comprising the steps of generating a coherent measurement beam and a first coherent reference beam by a light source, irradiating the object by the measurement beam and guiding the measurement beam reflected by the object to an optical sensor, guiding the first reference beam to a first mirror extending under an angle different from 90° with the optical axis of the first reference beam and guiding the first reference beam reflected by the first mirror to the optical sensor so that the measurement beam and the first reference beam together generate an interference pattern on the sensor, reading out the optical sensor and providing a digital signal representing the interference pattern generated on the optical sensor, processing the digital signal to obtain a digital hologram, subjecting the digital hologram to a Fourier transform in the spatial frequency domain to obtain a two dimensional spectrum comprising a DC-term, a first image term and a first conjugate image term, and subjecting the resulting spectrum to filtering to obtain a term representing the object.

The most important procedure in the off-axis DH is the spatial filtering process to eliminate other terms, i.e. a DC term (zero-order) and a twin image term (conjugate wave), and to obtain the high quality object wave from the digital hologram.

T. M. Kreis describes a simple method to suppress the DC term from the hologram (T. M. Kreis and W. P. P. Jüptner, "Suppression of the dc term in digital holography," Opt. Eng. 36, 2357-2360, 1997). This method consists in subtracting the mean intensity from the digital hologram, which permits only the elimination of the so-called DC term from the reconstructed images. It's a simple way to reduce the DC terms from the hologram but it's not sufficient in most of cases. If the object wave intensity is not constant in hologram plane in general, for example, the DC term caused by the object wave cannot be eliminated with this method.

E. Cuche proposed an improved approach known as spatial filtering used in the form of a band-pass filter (E. Cuche et al., "Spatial filtering for zero-order and twin-image elimination in digital off-axis holography," Appl. Opt. 39 (23), 4070-4075, 2000).

U.S. Pat. No. 6,262,818 to Cuche et al introduces the spatial filtering methods in two ways; one as the band-pass filtering method in the spatial frequency domain using FFT and the other as the optical spatial filtering method based on 4-f system. These methods depend on the critical assumption that the DC term and the desired term are well separated so that the DC term can be suppressed by filtering. However, they are also limited by these two aspects; one is that a certain fraction of the spectrum can be available and the other is that the spatial filtering often requires manual intervention for selecting the desired order.

Another method to achieve the effective filtering using additional images is disclosed in U.S. Pat. No. 6,809,845 to Kim et al. In this method, the reference wave intensity and object wave intensity are obtained in addition to the hologram in the system and these are used for removing the DC terms of the hologram by simple subtraction.

However, it needs additional hardware such as beam blockers and should record two more images except the hologram. In this case, it is assumed that the environmental conditions and system parameters should be kept constantly.

Recently, a nonlinear reconstruction technique has been introduced (N. Pavillon et al., "Suppression of the zero-order term in off-axis digital holography through nonlinear filtering," Appl. Opt. 48 (34), H186-H195, 2009). It enables exact zero-order free reconstruction in off-axis DHM even if the zero-order and the object wave spectra overlap. The nonlinear filtering technique works under two realistic assumptions on the digital hologram; first, the spectrum of the object wave should be confined to a quadrant of the Fourier domain and second, the intensity of the object wave should be much smaller than that of the reference.

However, the small intensity of the object wave can lower the visibility of the interference fringe and even a signal to noise ratio (SNR), which can cause other errors. It means the effectiveness of this method can be limited in the practical applications.

On the other hand, the suppression of the zero-order term by employing the information obtained during wavefront reconstruction in an iterative procedure was disclosed (N. Pavillon et al., "Iterative method for zero-order suppression in off-axis digital holography," Opt. Express 18 (15), 15318-15331, 2010). Consequently, it enables the DC term suppression without any a priori knowledge about the object.

However, this technique takes the calculation time until reaching to an acceptable error level as its definition.

SUMMARY OF THE INVENTION

The objective of the present invention is to provide a method and an apparatus allowing a reconstruction of the object wave wherein artefacts caused by the overlapping of the first image term by the DC-term in the two dimensional spectrum obtained by a Fourier transform of the hologram.

This aim is achieved by a method of the kind referred to above, further comprising the steps of generating a second coherent reference beam adapted to avoid interference with the first reference beam, guiding the second reference beam to the first mirror and guiding the beam reflected by the first mirror to the optical sensor, wherein the path of the second reference beam from the light source to the sensor has length different from the length of the equivalent path of the first reference beam, leading to a second image term and a conjugate of the second image term in the two dimensional spectrum of the Fourier transform in the spatial frequency domain, and replacing a section of the first image term overlapped by the DC-term by the corresponding section of the second image term.

This method avoids the disadvantages of the prior art as the part of the representation of the object beam, overlapped by the representation of the DC-term, is replaced by the corresponding part of the representation of the object beam which is not overlapped by the DC-term.

Apart from the method referred to above, the present invention also relates to an apparatus for preparing a digital hologram representing an object, the apparatus comprising a light source adapted to generate a coherent measurement beam and a first coherent reference beam, an optical sensor, a first mirror extending under an angle different from 90° with its optical axis, a holder that holds an object, a reading and processing unit connected to the optical sensor for reading out the optical sensor and for providing a digital signal representing the interference pattern thrown on the optical sensor, an optical guide unit adapted for guiding the measurement beam from the light source to the object held in the holder, for guiding the measurement beam reflected by the object to the optical sensor, for guiding the first reference beam from the light source to the first mirror and for guiding the first reference beam reflected by the first mirror to the optical sensor, so that an interference pattern is generated on the optical sensor, wherein the reading and processing unit is adapted to process the digital signal to obtain a digital hologram, to subject the digital hologram to a Fourier transform in the spatial frequency domain to obtain a two dimensional spectrum comprising a DC-term, a first image term and a first conjugate image term and to subject the resulting spectrum to filtering to obtain a term representing the object, wherein the light source is adapted to generate a second coherent reference beam adapted to avoid interference with the first reference beam, wherein that the optical guide unit is adapted to guide the second reference beam to the first mirror through a second path different from the path of the first reference beam and to guide the beam reflected by the first mirror to the optical sensor and wherein the reading and processing unit is adapted to replace a part of the first image term overlapped by the DC-term by the corresponding part of the second image term.

A first preferred embodiment provides a method of the kind referred to above wherein the replacement of the section of the first image term overlapped by the DC-term by the corresponding section of the second image term is carried out by the following steps: subjecting the digital representation of the image to a Fourier transform into the spatial frequency domain; subjecting the resulting spatial frequency spectrum of the image to a spatial frequency filtering so that the representations of the two object waves remain; subjecting the two representations of the object waves to inverse Fourier transforms in the spatial frequency domain; subjecting the representation of the object waves to application of the two reference beams; subjecting the resulting representations of the images to Fourier transforms; replacing the overlapping spectrum section of the first image by the corresponding section of the second image, and subjecting the spectrum region of the first image to an inverse Fourier transform.

Although other methods to replace the terms are not excluded the above mentioned preferred method provides an efficient way of performing this replacement.

Similar considerations count for an apparatus of the kind referred to above wherein the reading out and processing unit is adapted to replace the section of the first image term overlapped by the DC-term by the corresponding section of the second image term by the steps referred to above.

As stated above in the main claim the invention requires that the first and the second reference beam do not mutually interfere. There are several possibilities to generate such beams, but according to a preferred embodiment the first reference beam and the second reference beam are mutually orthogonally polarized. The orthogonal polarisations provide a set of beam, wherein the two reference beams do not mutually interfere, but wherein interference of either of the reference beams with the measurement beam is possible.

Although other implementations are not excluded, this embodiment is preferably implemented by a method wherein the first and the second reference beam are generated by the same light source and wherein both reference beams are subjected to mutually orthogonal polarisers.

The same advantages are obtained in an apparatus wherein the optical guide unit comprises a first polariser in the path of the first reference beam, a second polariser in the path of the second reference beam and wherein the first and the second polariser are orthogonally polarised.

To allow an interference pattern to develop between the second reference beam and the measurement beam being different from the reference pattern between the first reference beam and the measurement beam, the first and the second reference beams must have different properties, apart from the requirements to avoid mutual interference.

According to a preferred embodiment this is achieved in that the second reference beam is guided via a second mirror, extending perpendicular to the axis of the second reference beam. This embodiment also provides an apparatus comprising a second mirror extending perpendicular to the axis of the second reference beam and that the optical guide unit is adapted to guide the second reference beam via the second mirror.

Although the present invention provides a good solution for replacing the section of the first image term overlapped by the DC-term by the corresponding section of the second image term which is not overlapped by the DC-term, the initially overlapped part must be sufficiently small to be replaced. In particular it should not be larger than half of the total representation of the beam. To achieve this, a further preferred embodiment provides the feature that the modulus of the real part of the first image term is equal to the modulus of the imaginary part of the first image term.

According to an attractive constructional implementation the optical guide unit comprises a beam splitter with a first optical axis and a second optical axis, that the light source is located on the first optical axis, the reference mirror on the first optical axis at the side opposite the side of the light source, that the optical sensor is located on the second optical axis and that the holder is adapted to position the object on the second optical axis at the side opposite the side of the optical sensor.

The preceding claims relate to the preparation of a hologram. To enjoy the full advantage of the invention, the present invention provides a method for reconstruction of the image representing the object as well.

Here a preferred embodiment provides a method for reconstructing the image of an object represented by a digital hologram as obtained a method referred to above, wherein the digital hologram is subjected to a digital representation of a plane wave as a reference wave and that the reconstruction is executed digitally.

Yet another embodiment provides such a method, wherein the image representing the object is digitally processed to obtain a digital height map.

The present invention can also be applied in optical coherence tomography. According to a corresponding method the measurement beam is adapted to penetrate the object at least partially and to generate scattered beams in the object, and wherein the scattered beams are combined with both the first and the second measurement beams to form an interference pattern on the optical sensor.

This method allows to collect information from the upper layers of the object.

Further the present invention can be applied to interferometry. Accordingly in a special method the measurement beam and the first and the second reference beam are focussed on the object and that during the replacement of the section of the first image term overlapped by the DC-term by the corresponding section of the second image term the application of the two reference waves to the representation of the image is omitted.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Figure 1:
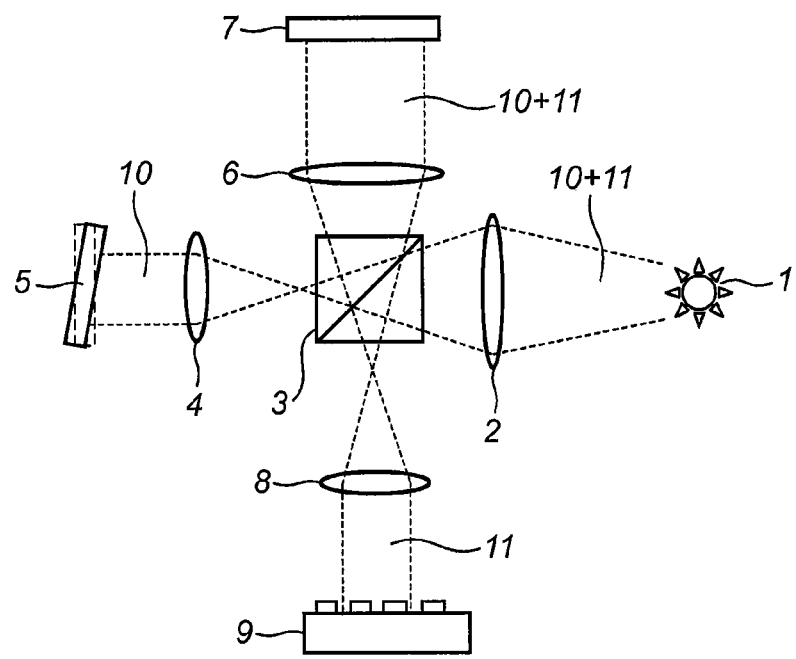
FIG. 1 is a diagram showing the prior art optical configuration for off-axis digital holography.

FIG. 1 discloses a typical prior art configuration for off-axis digital holography, wherein the hologram is obtained from the interference between a coherent object wave (O) and a coherent reference wave (R). Then, the two-dimensional (2D) intensity distribution (IH) can be expressed as:

$$I_H(x,y)=(R+O)(R^*+O^*)=|R|^2+|O|^2+R^*O+RO^* \quad (1)$$

wherein R* and O* denote the complex conjugates of the both waves.

After recording the hologram, the reconstructed wave (ψ) can be obtained by the illumination of the hologram with a reconstruction wave U as follows:

$$\psi=I_H \cdot U=|R|^2 U+|O|^2 U+R^*OU+RO^*U \quad (2)$$

The first two terms of Eq. (2) form the zero-order of diffraction, sometimes called a DC term. The third and the fourth terms are produced by the interference terms and they generate two conjugate or twin images of the object. The third term (R*OU) produces a virtual image located at the initial position of the object (object plane) and the fourth term (RO*U) produces a real image located on the other side of the hologram (in the image plane).

If the reconstruction is performed by illuminating the hologram with a replica of the reference wave (U=R), the third term of Eq. (2) becomes a replica of the object wave multiplied by the reference intensity ($|R|^2 O$). Reciprocally if U=R*, the fourth term is a replica of the conjugate object wave multiplied by the reference intensity ($|R|^2 O^*$).

For reconstruction of the object wave, only the third term should be extracted from the original hologram as shown in Eq. (2). In case of the off-axis DH, the two-dimensional spectrum of the hologram in the spatial frequency domain can be obtained by the Fourier transform, so that the extraction can be easily performed because the different terms of the interference produce well-separated contributions by the spatial modulation. Then, the unwanted terms of Eq. (2) can be filtered out with several techniques such as band-pass filtering or nonlinear filtering, and only the third term can be extracted and obtained.

Figure 2:
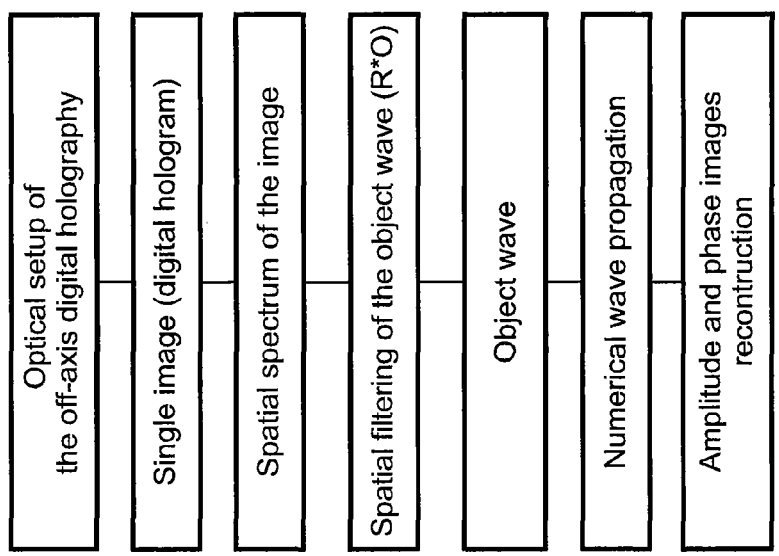
FIG. 2 is a flow chart of the reconstruction procedure for typical off-axis digital holography.

FIG. 2 shows the reconstruction procedure of a typical off-axis DH.

As previously stated, however, the object wave extracted from the hologram still has some noise caused by the overlapping region between the DC term and the object wave term. Even, the nonlinear filtering method can be limited by its operating conditions in the practical applications.

In this invention, a novel and effective spatial filtering technique to extract the exact object wave in off-axis DH is presented. It is based on the simultaneous acquisition of two digital holograms, which can be separated by the distinct spatial modulation, in a single image. In other words, two reference waves ($R_1$ and $R_2$), which have different spatial modulation directions, are used for recording digital holograms contrary to the typical off-axis DH which typically uses only one reference wave.

Consequently, each reference wave can generate each interference with the object wave. It is noted that the interference between two reference waves should not be included in this image containing two holograms. It can be practically implemented by using the orthogonal polarized reference lights or using a low coherence source, for example, as shown in FIG. 3 and FIG. 4.

Figure 3:
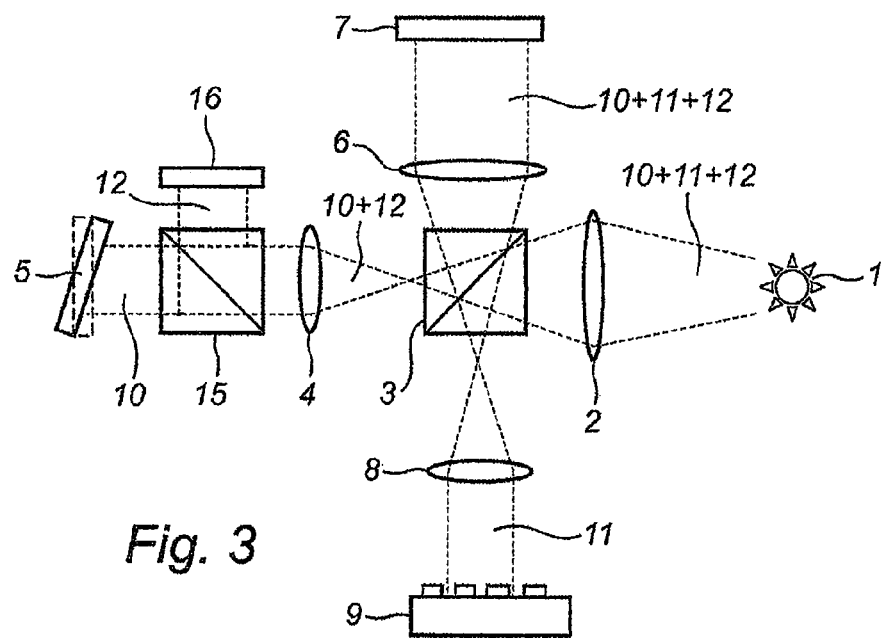
FIG. 3 is a diagram showing the optical configuration of off-axis DH according to the invention.

FIG. 3 discloses a configuration, substantially conforming the configuration shown in FIG. 1, but wherein a second beam splitter 15 is located between the first objective lens 4 and the reference mirror 5. Further a second reference mirror 16 is provided, optically connected to the second beam splitter 15. This configuration allows to handle not only the measurement beam 11 and the first reference beam 10, but also the second reference beam 12.

Herein the second reference beam is guided to the second mirror 16 via the second beam splitter 15, allowing all three beams 10, 11 and 12 to hit the image sensor 7. This allows two interference patterns to develop, i.e. a first interference pattern between the measurement beam and the first reference beam and a second interference pattern between the measurement beam and the second reference beam. To inhibit the development of mutual interference between the two reference beams 10, 12 these beams are preferably orthogonally polarized, for instance through using a polarizing beam splitter as the second beam splitter 15.

Figure 4:
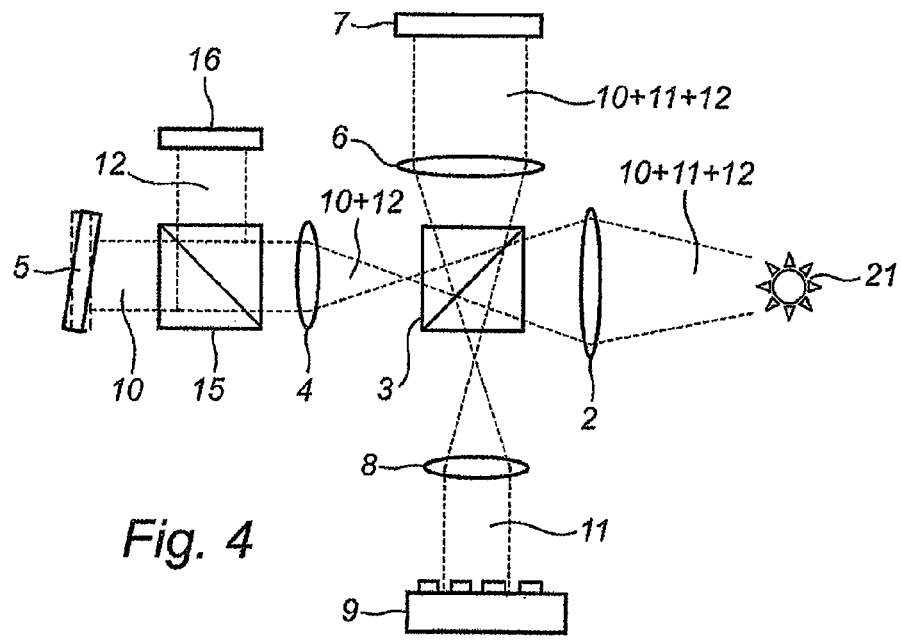
FIG. 4 is a diagram according to FIG. 3 with a low coherence optical source.

FIG. 4 depicts the structure of an embodiment wherein other features are used to avoid mutual interference between the reference beams. In this embodiment the light source is a low coherence light source 21. The low coherence light from this source can limit the interference range by definition. The structure of this embodiment, depicted in FIG. 4 is equivalent to that of the preceding embodiment, but wherein the location of the second reference mirror 16 has been adapted to avoid interference between the two reference beam and—of course—the use of a low coherence light source.

As the result, the image ($I_{2H}$) containing two holograms in this method can be expressed as:

$$I_{2H}(x,y)=|R_1|^2+|O|^2+|R_2|^2+|O|^2+R_1^*O+R_1 O^*+R_2^*O+R_2 O^* \quad (3)$$

Similar to Eq. (2), the first four terms of Eq. (3) mean zero-order diffraction (or DC term) in the spatial frequency domain. The fifth and sixth terms are interference terms by $R_1$, and their spatial frequencies are located symmetrically with respect to the centre of the image in the spatial frequency domain. On the other hand, the seventh and eighth terms are the interference terms by $R_2$, and their spatial frequencies are also located symmetrically. In this case, these four interference terms can be spatially separated in the spatial frequency domain due to the different spatial modulations of $R_1$ and $R_2$. It is preferred in this method that each term is located in each quadrant of the domain adjusting the tilts of the reference mirrors and it is not any expertise work in hardware.

Figure 5A:
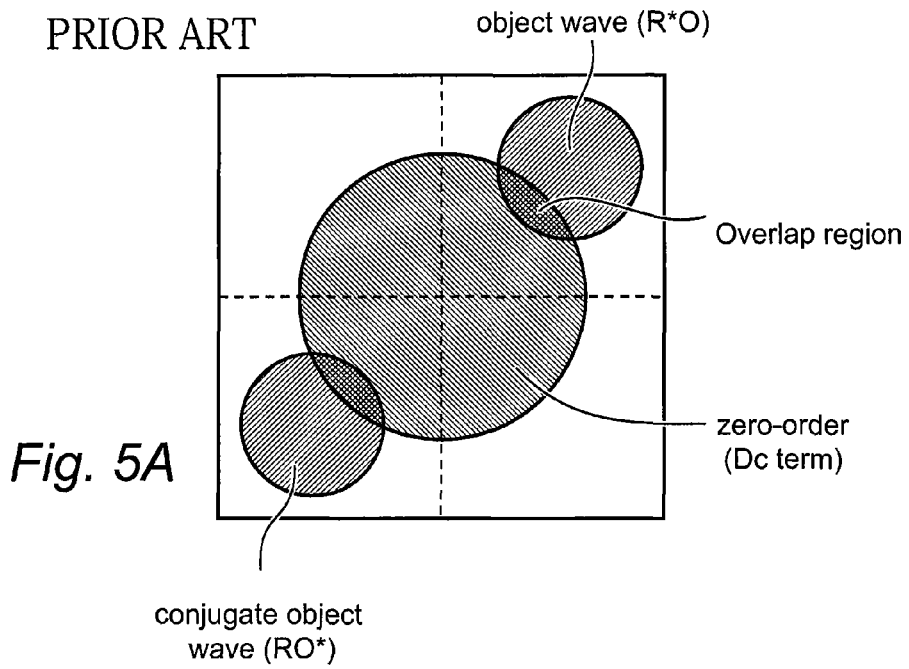
FIGS. 5A and 5B are two diagrams showing the spatial frequency contents of a hologram according to the prior art and the present invention respectively.

In fact, the main difficulty to extract the object wave in the typical off-axis DH is caused by the overlapping region between the DC term and the interference terms (object wave and its conjugate) in the spatial frequency domain as shown in FIG. 5A.

Figure 5B:
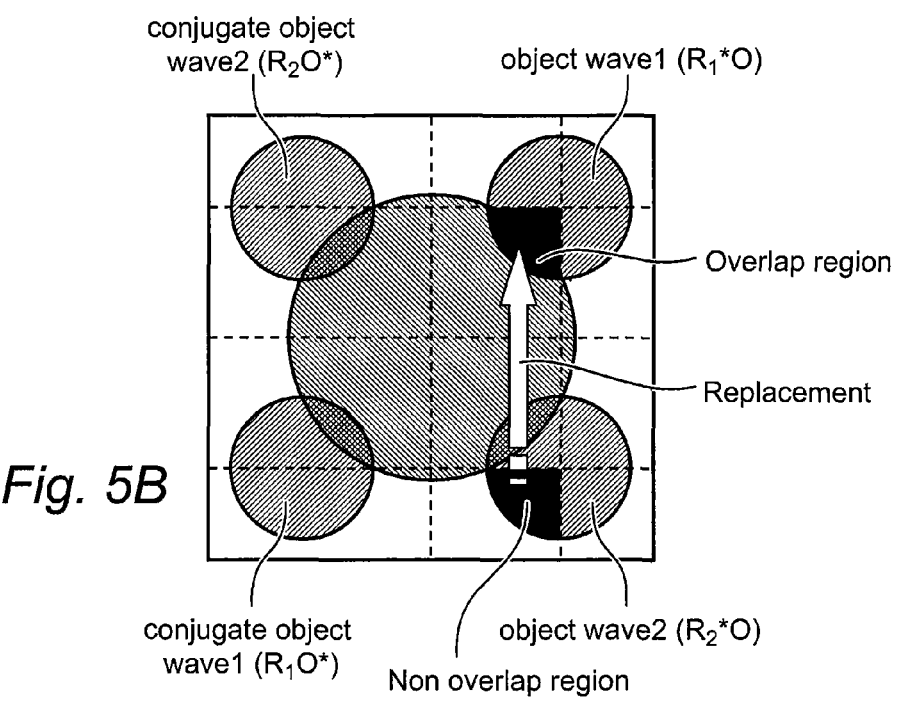

In this invention, however, the overlapping region between the DC term and the object wave in the first hologram can be replaced with non-overlapping region of the object wave in the second hologram because the image contains two holograms where the same objective wave is recorded. For example, the overlapping region of $R_1*O$ (left-down quadrant of the object wave ($R_1*O$) frequency contents) can be replaced with the non-overlapping region of $R_2*O$ as shown in FIG. 5B. It is based on the fact that the spatial modulation frequencies of the reference waves can be located in the diagonal axes in the domain and most of the overlapping region is placed in one quadrant of spatial frequency contents of the object wave between the DC term and object wave.

Practically, this operation can be performed after multiplying each reconstruction wave (as same as each reference wave) to each band-pass filtered object wave. In other words, two object waves can be obtained using two reference waves, respectively. They should be theoretically the same but slightly different because of the overlapping region. From these two object waves, then, the spatial frequency components of one object wave in the overlapping region are replaced with those of the other object wave in the non-overlapping region. In most of cases, this method can provide better amplitude and phase information because the overlapping region is one quadrant of spatial frequency contents of the object wave except for the small spatial modulation of the reference wave or high stiff object which has high spatial frequency components.

Even in worst cases, this method can reduce the more overlapping errors than other methods. Consequently, the use of another reference wave in off-axis DH can make the second hologram which can give an additional object wave to replace the overlapping region between the DC term and the object wave in the first hologram with non-overlapping region in the spatial frequency domain in the second hologram.

After obtaining the exact object wave in the hologram plane using this new filtering method, the wave propagates back from the hologram plane to the object plane numerically based on the scalar diffraction theory. By employing the Fresnel approximation, the reconstructed object wave ($\psi_O$) can be calculated from the object wave ($\psi_H$) in the hologram plane as:

$$\psi_O = \frac{A\exp(i2\pi d/\lambda)}{i\lambda d}\exp\left[\frac{i\pi}{\lambda d}(x_O^2 + y_O^2)\right]F\left\{\psi_H\exp\left[\frac{i\pi}{\lambda d}(x_H^2 + y_H^2)\right]\right\} \quad (4)$$

where $\lambda$ is the wavelength and d is the distance between the hologram plane and the object plane. ($x_O$, $y_O$) and ($x_H$, $y_H$) mean the two dimensional coordinates of the object plane and the hologram plane, respectively.

$F\{\}$ denotes a 2-D Fourier transform in the spatial domain. A is an arbitrary number, determined by the amplitudes of the reference wave and the reconstruction wave. From the resultant wave ($\psi_O$), the amplitude and phase images of the object can be decomposed and finally 3D surface height map is obtained from the phase image.

Figure 6:
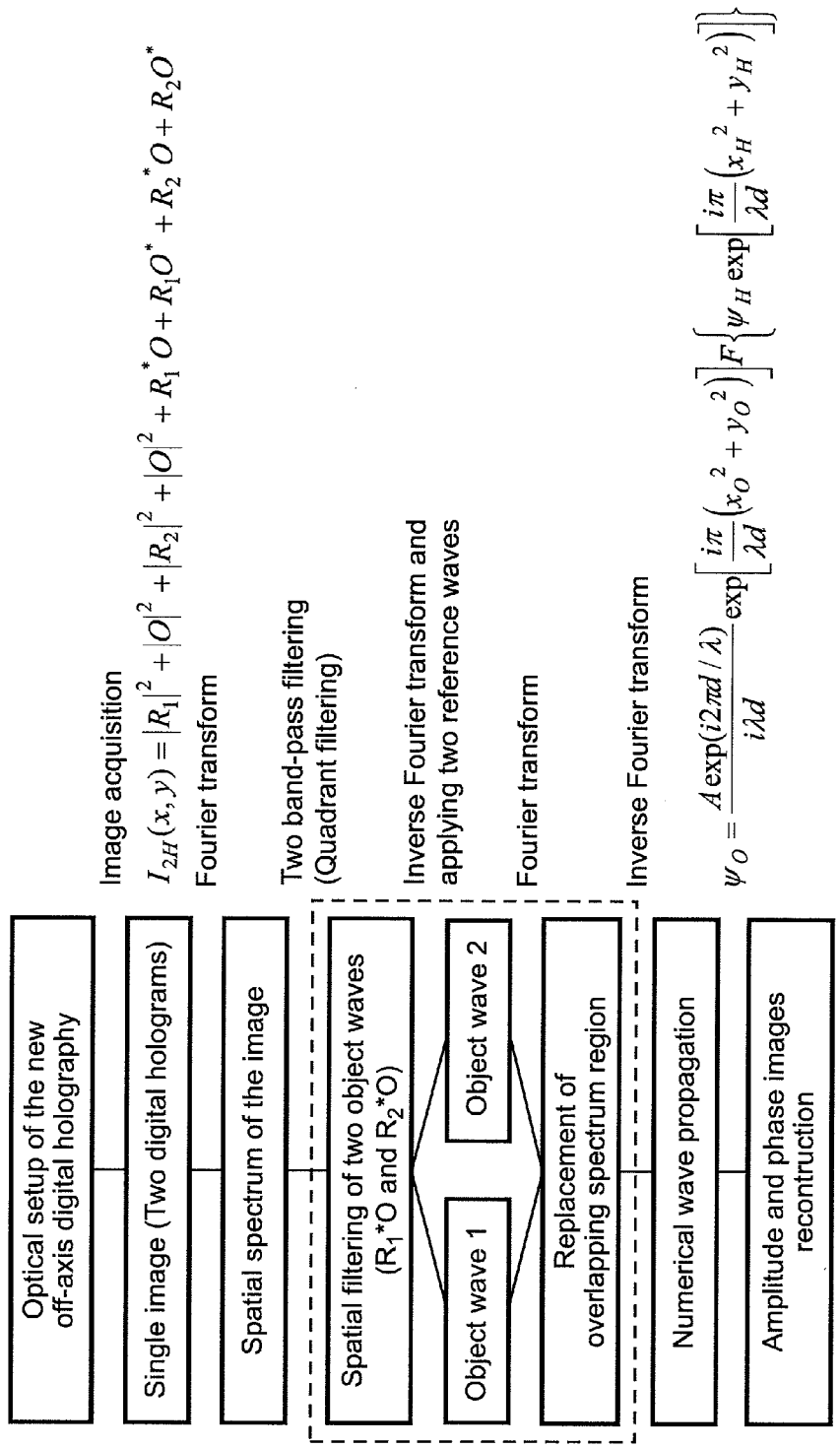
FIG. 6 is a flow chart according to FIG. 2, wherein two reference waves have been applied.
Figure 7A:
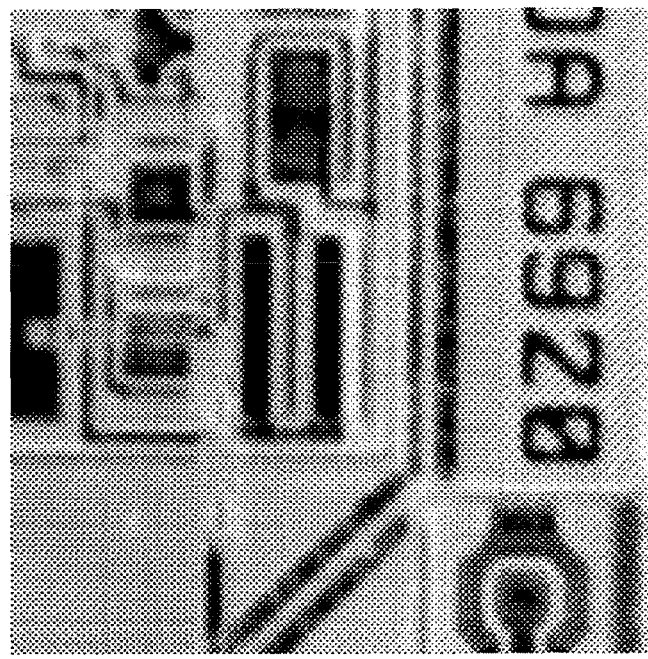
FIGS. 7A and 7B are a 2D intensity image and a 3D height map of the electronic circuit image.
Figure 7B:
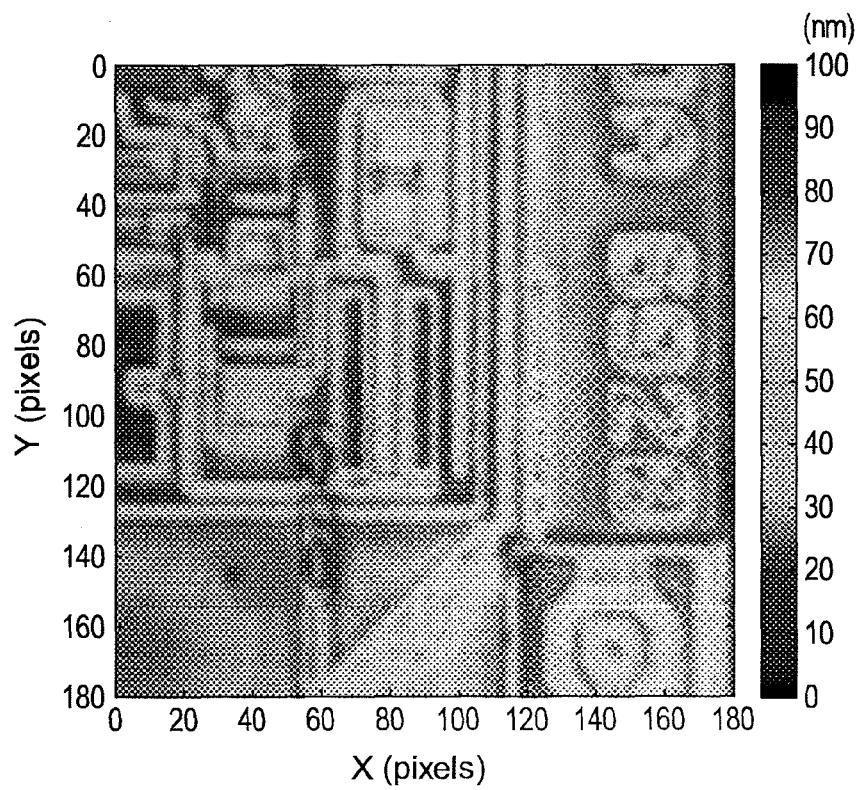

FIG. 6 shows the whole procedure to reconstruct the exact object wave with two reference waves in this invention. In order to validate the effectiveness of this invention, the simulation of the off-axis DH was performed with the typical spatial filtering technique based on band-pass filtering and the new filtering technique with two reference waves. For generating the digital hologram, an electronic circuit image (181× 181 pixels) was used as shown in FIGS. 7A and 7B. FIG. 7A shows the 2D intensity image and FIG. 7B presents the 3D height map of the circuit. The maximum height was assumed as 100 nm to avoid the ambiguity problem. The distance between the object plane and the hologram plane was 2 mm.

Figure 8A:
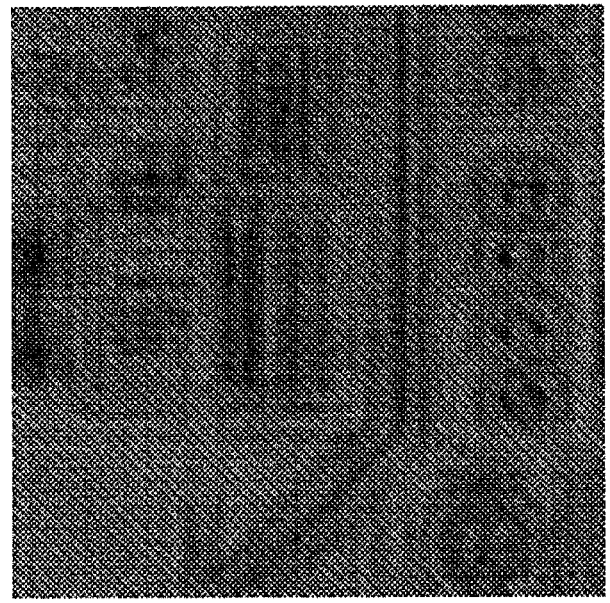
FIG. 8A is a digital hologram of prior art off-axis DH.
Figure 8B:
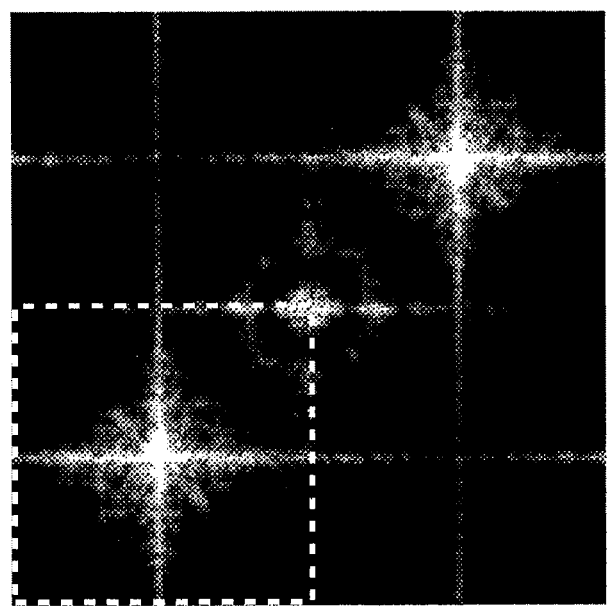
FIG. 8B is a spatial spectrum of the hologram depicted in FIG. 8A wherein the rectangle indicates the quadrant including the object wave.

In the typical off-axis DH, only one reference wave was used for the interference and the digital hologram could be obtained on the hologram plane as shown in FIG. 8A. In the hologram, the interference term was spatially modulated with the tilted reference wave. Then, the digital hologram could decompose the DC term, the object wave and its conjugate term in spatial frequency domain applying a 2D Fourier transform as shown in FIG. 8B. The quadrant including the object wave (R*O) is the lower left quadrant.

Figure 9:
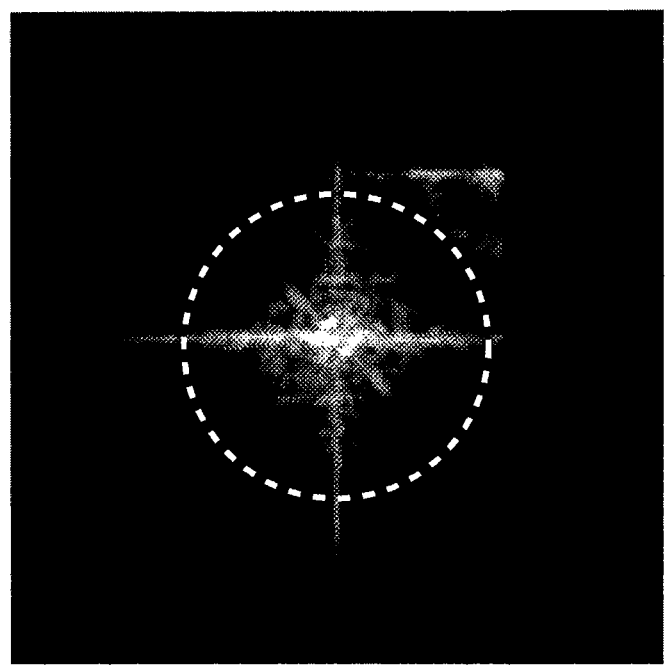
FIG. 9 is a spatial spectrum of the object wave, wherein the dot circle indicates the spatial frequency contents of the object wave.

In order to extract the object wave from the hologram, the quadrant including the object wave was only band-pass filtered and the reconstruction wave as same as the reference wave was applied to the filtered term to remove the spatial modulation frequency. FIG. 9 shows the spatial spectrum of the object wave. As shown in FIG. 9, the DC term was added in the filtered region beyond the dot circle, which means most the spatial frequency contents of the object wave. The further band-pass filtering can be applied to this spectrum to remove the DC term but, as previously explained, it limits the available spectrum of the object wave and often requires manual intervention for selecting the desired order.

Figure 10A:
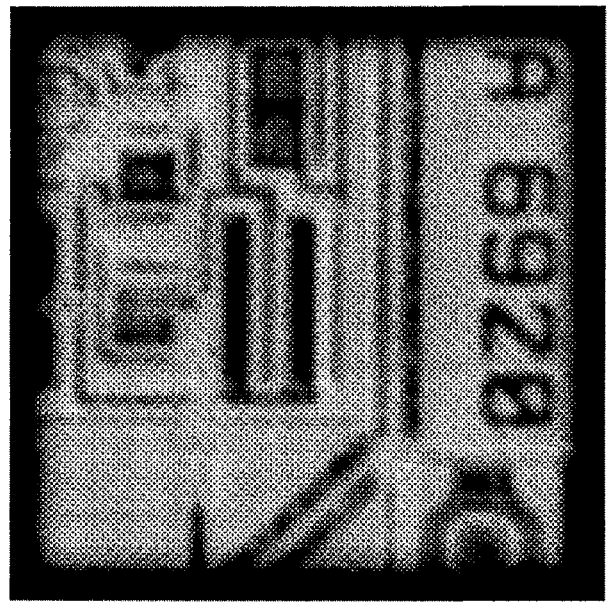
FIG. 10A is a reconstructed 2D intensity image.
Figure 10B:
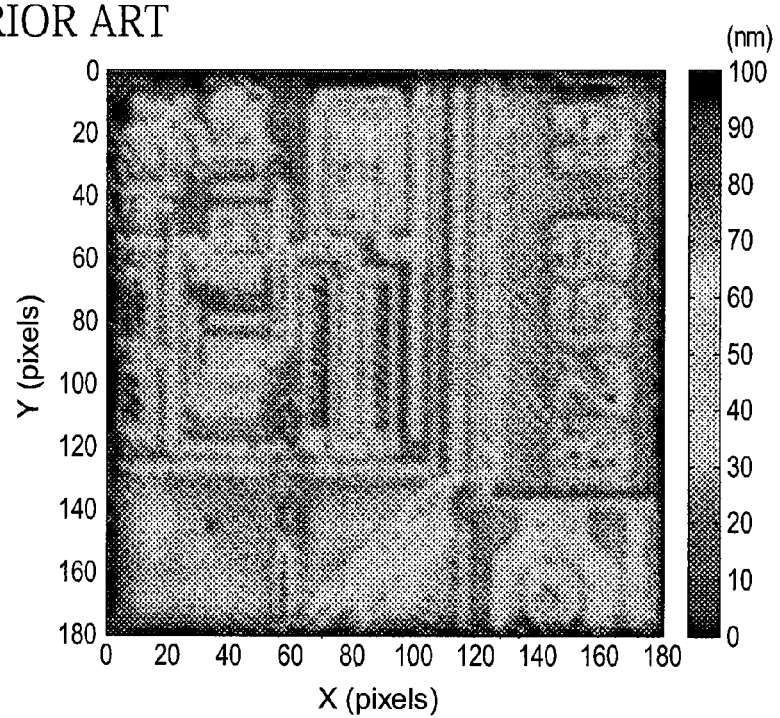
FIG. 10B is a reconstructed 3D height map.

After filtering the object wave, the final step was that the object wave was propagated numerically using Eq. (4). In the result, the 2D intensity image and the 3D height map were reconstructed as shown in FIGS. 10A and 10B. It is noted that the edge of the image was apodized to remove the diffraction effect caused by the edges of the image during the numerical propagation. FIGS. 10A and 10B display some artifacts in the reconstructed image which are primarily due to the remaining DC term.

Figure 11A:
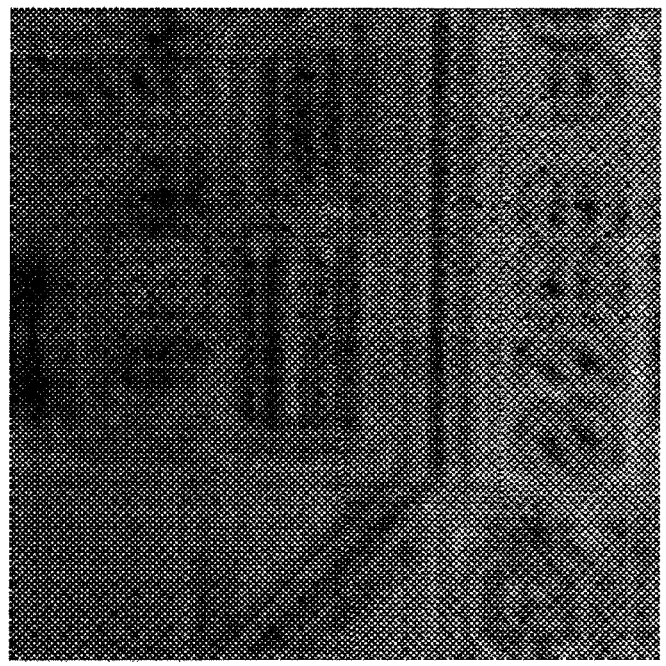
FIG. 11A is a digital hologram of off-axis DH according to the invention.
Figure 11B:
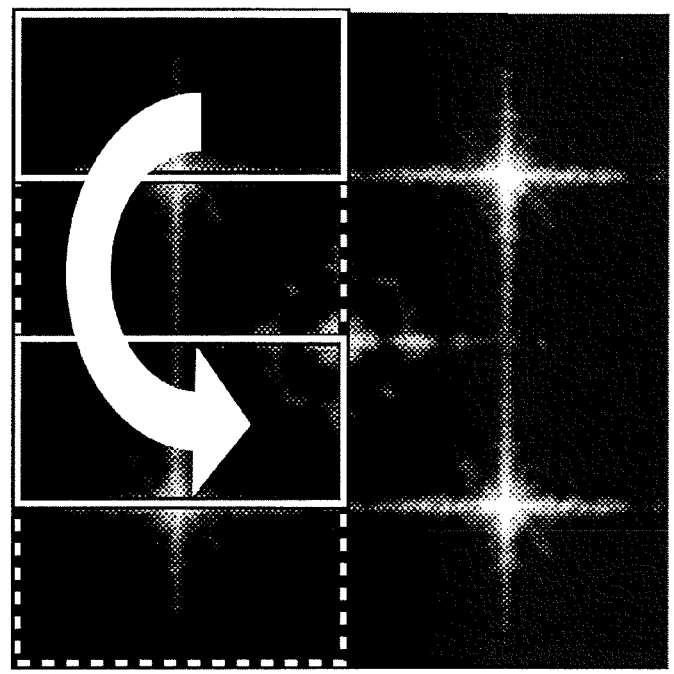
FIG. 11B is a spatial spectrum of the hologram depicted in FIG. 11A.

On the other hand, the image obtained from the new off-axis DH of this invention contains two holograms, which means two distinguishable interferences by different spatial modulations as shown in FIG. 11A.

Figure 12:
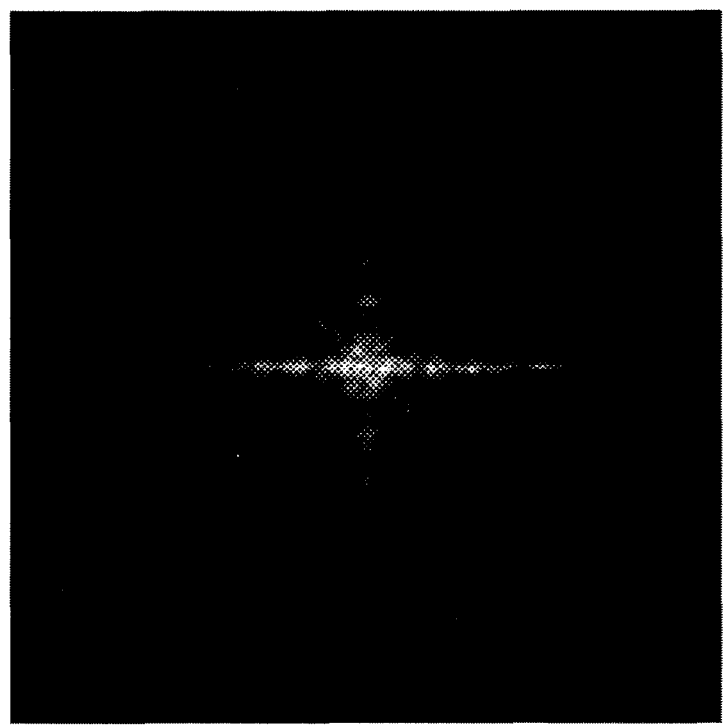
FIG. 12 is a spatial spectrum of the object wave extracted according to the invention.

In the spatial frequency domain, two object wave terms ($R_1*O$ and $R_2*O$) and their conjugate ($R_1O*$ and $R_2O*$) terms appear. The lower left quadrant includes the object wave with the first reference wave ($R_1*O$) and the upper left quadrant includes the object wave with the second reference wave ($R_2*O$). Then, using two object wave spectrums, the region including the DC term of the upper portion of the lower left quadrant in $R_1*O$ was replaced with the upper portion of the upper left quadrant in $R_2*O$, which did not include the DC term, after applying each reference wave as the reconstruction wave. Because the DC term was eliminated with this procedure, the resultant spatial spectrum of the object wave was not affected by the DC term as shown in FIG. 12.

Figure 13A:
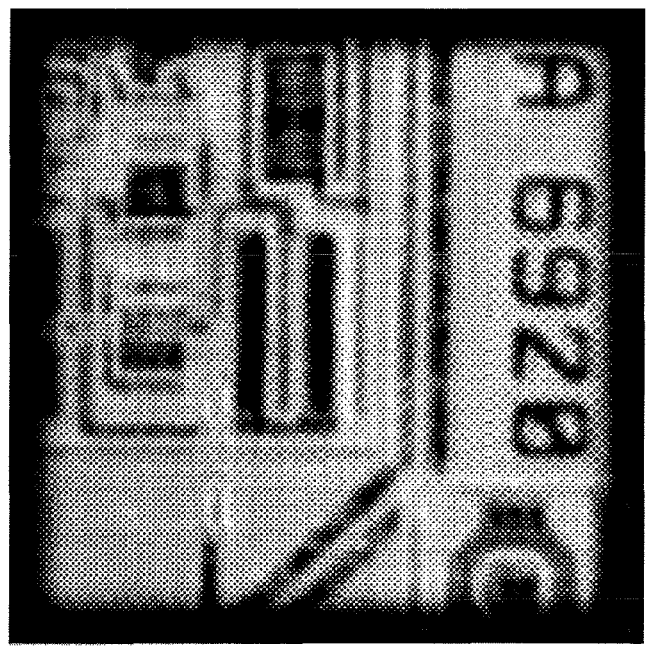
FIG. 13A is a reconstructed 2D intensity image according to the invention.
Figure 13B:
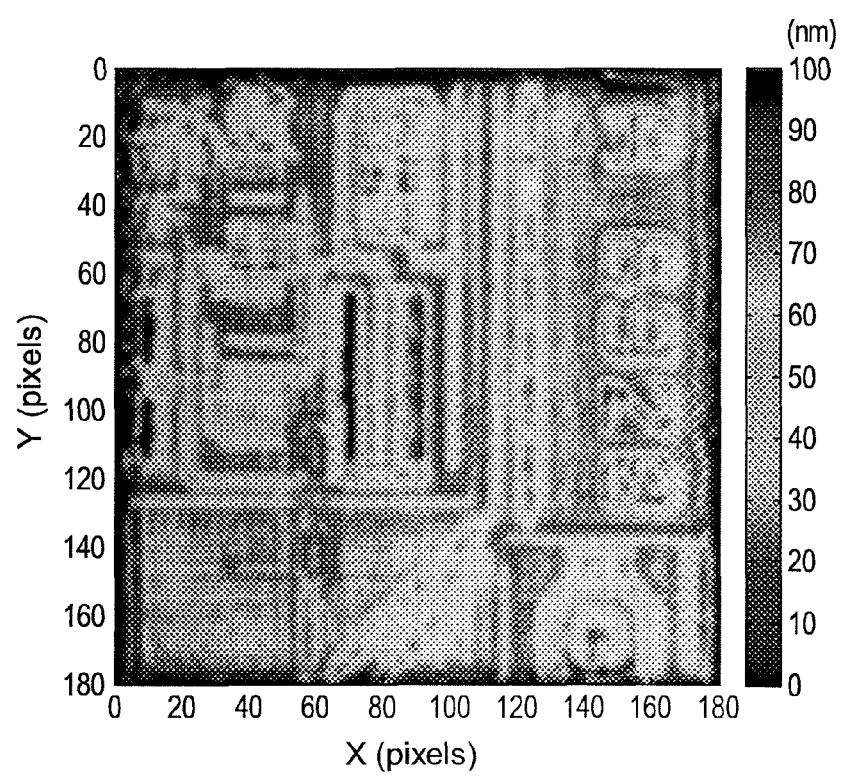
FIG. 13B is a reconstructed 3D height map according to the invention.

FIG. 13 shows the reconstructed 2D intensity image and the 3D height map after applying the numerical propagation of the object wave extracted by the new technique of this invention. Compared to the reconstructed images by the conventional method shown in FIGS. 10A and 10B, it is confirmed that the images have the better quality and they don't include any artifacts, which appears in FIGS. 10A and 10B.

Figure 14:
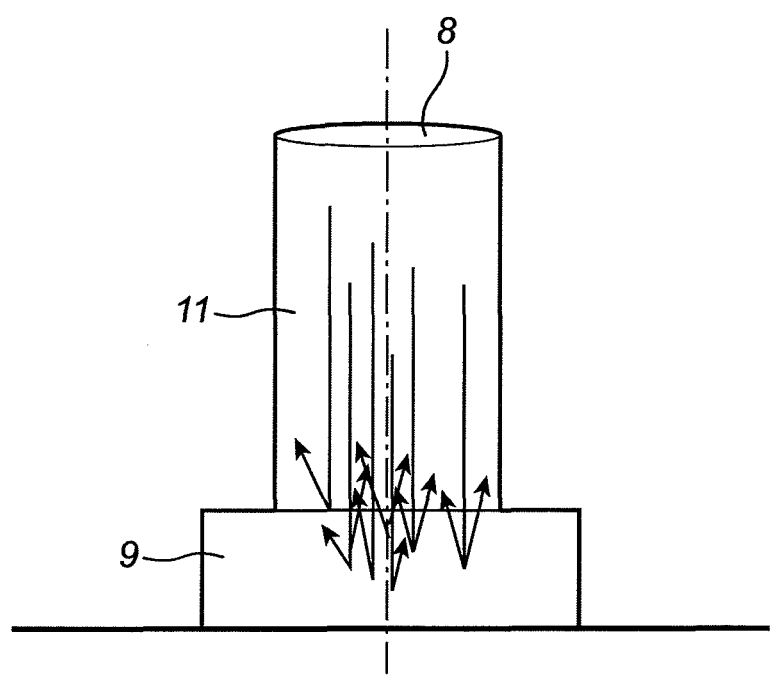
FIG. 14 is a diagram depicting the application of the features of the present invention to tomography.

Finally FIG. 14 depicts a situation wherein the features of the present invention are applied to tomography. Under tomography in this context the investigation of an upper layer of the object is understood. Herein the word 'tomography' has a meaning different from the more common use of this word to indicate a process wherein a body is investigated by penetrating radiation and wherein the body rotates relative to the source of the penetrating radiation and its detector.

In the present invention use is made of a light beam having such properties that it penetrates the upper layer to some extend and is subject to scattering within the upper layer. The scattered beam is further subject to the same process as the reflected beam in preceding embodiments.

It will be clear that numerous variations on the embodiments disclosed above are possible within the scope of the accompanying claims.

The procedure described above of this invention can be performed by a computer which has a CPU, ROM and RAM that executes a computer readable program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method for reconstructing an image of an object represented by a digital hologram, the method comprising:
    generating a measurement beam and a first reference beam;
    irradiating the object by the measurement beam, the measurement beam becoming an object wave by reflection with the object, and guiding the object wave to an optical sensor;
    guiding the first reference beam to a first mirror that reflects the first reference beam with a tilt angle so that the object wave and the first reference beam together generate a first interference pattern on the optical sensor, the first interference pattern being an off-axis interference pattern, and guiding the first reference beam reflected by the first mirror to the optical sensor;
    generating a second reference beam that does not interfere with the first reference beam;
    guiding the second reference beam to a second mirror and guiding the second reference beam reflected by the second mirror to the optical sensor so that the object wave and the second reference beam together generated a second interference pattern on the optical sensor;
    reading out the optical sensor and providing a digital signal representing the interference patterns generated on the optical sensor;
    processing the digital signal to obtain a digital hologram;
    subjecting the digital hologram to a Fourier transform in the spatial frequency domain to obtain a two dimensional spectrum comprising a DC-term, a first image term, a first conjugate image term, a second image term, and a second conjugate image term, the first image term and the first conjugate image term being derived from the first interference pattern, and the second image term and the second conjugate image term derived from the second interference pattern;
    cutting out a section of the first image term, which section is a certain region in a two dimensional spectrum derived by the Fourier transform and is overlapped with the DC-term,
    replacing the cut section by the corresponding section of the second image term, the corresponding section of the second image term and the cut section of the first image term including same information with regard to the object wave; and
    subjecting the obtained spectrum region of the first image to an inverse Fourier transform and reconstructing the image of the object represented by the digital hologram.

2. The method according to claim 1,
    wherein the first reference beam and the second reference beam are mutually orthogonally polarized.

3. The method according to claim 2,
    wherein the first reference beam and the second reference beam are generated by a same light source and are subjected to mutually orthogonal polarisers.

4. The method according to claim 1, wherein the second mirror extends perpendicular to an axis of the second reference beam.

5. The method according to claim 1,
    wherein a modulus of a real part of the first image term is equal to a modulus of an imaginary part of the first image term.

6. A method for reconstructing the image of an object represented by a digital hologram as obtained by the method according to claim 1,
    wherein the digital hologram is subjected to a digital representation of a plane wave as a reference wave and the reconstruction is executed digitally.

7. The method according to claim 6,
    wherein the image representing the object is digitally processed to obtain a digital height map.

8. The method according to claim 1,
    wherein the method is applied in tomography,
    the measurement beam is adapted to penetrate the object at least partially and to generate scattered beams in the object, and
    the scattered beams are combined with both the first and the second measurement beams to form an interference pattern on the optical sensor.

9. A method for reconstructing an image of an object represented by a digital hologram, the method comprising:
    generating a measurement beam and a first reference beam;
    irradiating the object by the measurement beam, the measurement beam becoming an object wave by reflection with the object, and guiding the object wave to an optical sensor;
    guiding the first reference beam to a first mirror that reflects the first reference beam with a tilt angle so that the object wave and the first reference beam to ether generate a first interference pattern on the optical sensor, the first interference pattern being an off-axis interference pattern and guiding the first reference beam reflected by the first mirror to the optical sensor;

generating a second reference beam that does not interfere with the first reference beam;

guiding the second reference beam to a second mirror and guiding the second reference beam reflected by the second mirror to the optical sensor so that the object wave and the second reference beam together generate a second interference pattern on the optical sensor;

reading out the optical sensor and providing a digital signal representing the interference patterns generated on the optical sensor;

processing the digital signal to obtain a digital hologram;

subjecting the digital hologram to a Fourier transform in the spatial frequency domain to obtain a two dimensional spectrum comprising a DC-term, a first image term, a first conjugate image term, a second image term, and a second conjugate image term, the first image term and the first conjugate image term being derived from the first interference pattern, and the second image term and the second conjugate image term being derived from the second interference pattern;

cutting out a section of the first conjugate image term, which section is a certain region in two dimensional spectrum derived by the Fourier transform and is overlapped with the DC-term, replacing the cut section by the corresponding section of the second conjugate image term, the corresponding section of the second conjugate image term and the cut section of the first conjugate image term including same information with regard to the object wave; and subjecting the obtained spectrum region of the first image to an inverse Fourier transform and reconstructing the image of the object represented by the digital hologram.

10. An apparatus for reconstructing an image of an object represented by a digital hologram, the apparatus comprising:

a light source adapted to generate a measurement beam that irradiates the object, and a first reference beam, the measurement beam becoming an object wave by reflection with the object;

an optical sensor, which receives the object wave;

a first mirror that reflects the first reference beam with a tilt angle so that the object wave and the first reference beam together generate a first interference pattern on the optical sensor, the first interference pattern being an off-axis interference pattern;

a holder that holds the object;

a reading and processing unit connected to the optical sensor for reading out the optical sensor and for providing a digital signal representing the interference pattern thrown on the optical sensor; and an optical guide unit that:

guides the object wave to the optical sensor;

guides the measurement beam from the light source to the object held in the holder;

guides the measurement beam reflected by the object to the optical sensor;

guides the first reference beam from the light source to the first mirror that reflects the first reference beam with a tilt angle so that the object wave and the first reference beam together generate a first interference pattern on the optical sensor, the first interference pattern being an off-axis interference pattern;

guides the first reference beam reflected by the first mirror to the optical sensor, and guides a second reference beam to a second mirror and guides the second reference beam reflected by the second mirror to the optical sensor so that the object wave and the second reference beam together generate a second interference pattern on the optical sensor;

wherein the reading and processing unit:

generates the second reference beam that does not interfere with the first reference beam;

reads out the optical sensor and providing a digital signal representing the interference patterns generated on the optical sensor;

processes the digital signal to obtain a digital hologram;

subjects the digital hologram to a Fourier transform in the spatial frequency domain to obtain a two dimensional spectrum comprising a DC-term, a first image term, a first conjugate image term, a second image term, and a second conjugate image term, the first image term and the first conjugate image term being derived from the first interference pattern, and the second image term and the second conjugate image term being derived from the second interference pattern;

cuts out a section of the first image term, which section is a certain region in a two dimensional spectrum derived by the Fourier transform and is overlapped with the DC-term, replaces the cut section by the corresponding section of the second image term, the corresponding section of the second image term and the cut section of the first image term including same information with regard to the object wave; and subjects the obtained spectrum region of the first image to an inverse Fourier transform and reconstructs the image of the object represented by the digital hologram.

11. The apparatus according to claim 10, wherein the optical guide unit comprises a first polariser in the path of the first reference beam, and a second polariser in the path of the second reference beam, and wherein the first polariser and the second polariser are orthogonally polarised.

12. The apparatus according to claim 10, further comprising:

a second mirror extending perpendicular to an axis of the second reference beam, wherein the optical guide unit guides the second reference beam via the second mirror.

13. The apparatus according to claim 10, wherein the optical guide unit comprises a beam splitter with a first optical axis and a second optical axis, the light source is located on the first optical axis, the reference mirror is located on the first optical axis at a side opposite a side of the light source, the optical sensor is located on the second optical axis, and the holder positions the object on the second optical axis at a side opposite a side of the optical sensor.

* * * * *

UNITED STATES PATENT AND TRADEMARK OFFICE
CERTIFICATE OF CORRECTION

PATENT NO. : 8,659,810 B2
APPLICATION NO. : 13/341178
DATED : February 25, 2014
INVENTOR(S) : Ki-Nam Joo Page 1 of 1

It is certified that error appears in the above-identified patent and that said Letters Patent is hereby corrected as shown below:

In the Claims:

At column 12, line 63 (claim 9, line 10), the expression "to ether" should read --together--.

Signed and Sealed this
Fifth Day of August, 2014

Michelle K. Lee
*Deputy Director of the United States Patent and Trademark Office*